United States Patent Office 3,360,990
Patented Jan. 2, 1968

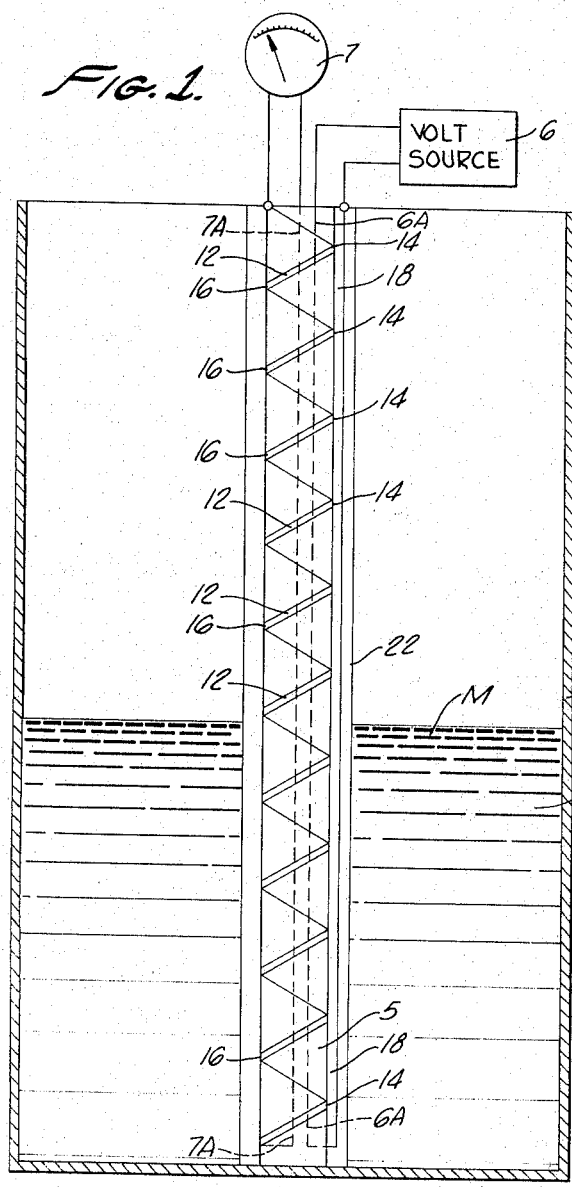
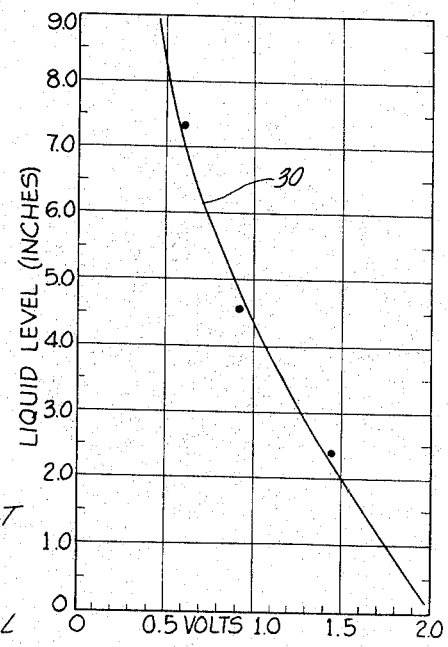
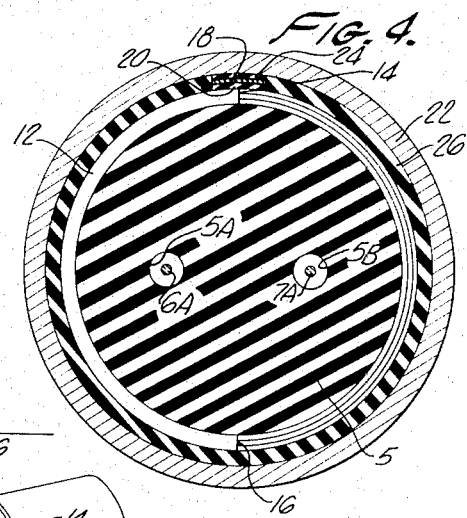
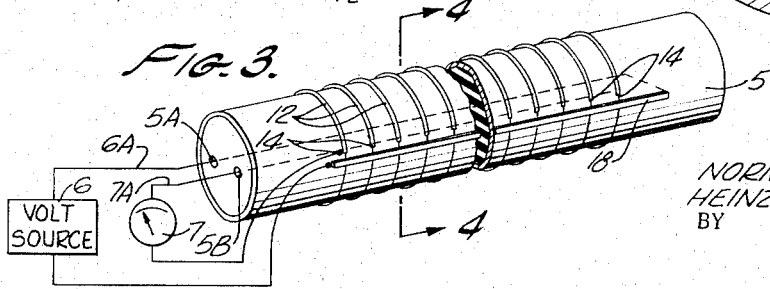
INVENTORS,
NORMAN D. GREENE
HEINZ F. POPPENDIEK
BY
Lyon & Lyon
ATTORNEYS

3,360,990
THERMOELECTRIC LIQUID LEVEL INDICATING SYSTEM
Norman D. Greene, Box 148, Rte. 1, Del Mar, Calif. 92014, and Heinz F. Poppendiek, 8686 Dunaway Drive, La Jolla, Calif. 92037
Filed Dec. 31, 1964, Ser. No. 422,626
5 Claims. (Cl. 73—295)

ABSTRACT OF THE DISCLOSURE

A series of cold and hot thermocouple junctions are spirally disposed around a rod extending vertically in a tank and only the hot junctions are heated to produce a heat flow past the hot junctions only into the surrounding fluid and into the surrounding atmosphere depending on the fluid level. All of the junctions are connected in series with a meter which indicates fluid level.

---

The present invention relates to means and techniques useful in liquid level determinations and in general involves the use of thermal sensitive elements such as thermocouples which manifest a change in an electrical property in response to temperature changes.

Briefly, the arrangement described herein includes an assembly of thermocouples, spirally disposed on a rod positioned vertically in a tank in which liquid level determinations are to be made. Alternate thermocouples in the series are heated by a heater strip extending longitudinally of the rod. The heater strip is supplied with heating current which is maintained to produce a constant heating effect on such alternate ones of said thermocouples, the other thermocouples being non-heated by the heater strip. All of the thermocouples are connected in an electrical series circuit, and the composite voltage or current produced by all of the thermocouples is indicated on, for example, an ammeter or voltmeter.

The operation of the system is dependent upon cooling rates between, on the one hand, the heated or hot junctions immersed in the liquid and, on the other hand, the corresponding heated or hot junctions which are in contact with the gaseous medium or blanket above the liquid. For example, both heated and unheated thermopile or thermocouple junctions which are in contact with the liquid will be approximately at the same temperature because of the great heat dissipation qualities of the liquid. The voltage or current thus produced by those junctions immersed in the liquid is substantially zero and may be neglected. On the other hand, the heated or hot junctions which are exposed to the gaseous medium above the liquid will be relatively much hotter than the unheated junctions above the liquid primarily because of the poor thermal conductivity of the gas at that location. Thus, the voltage produced per thermocouple by the thermopile junctions situated in the gas will be greater than that produced by the junctions immersed in the liquid. The composite output voltage is thus approximately proportional to the number of junctions not immersed in the liquid, and thus the liquid level is approximately linearly and inversely proportional to the composite thermopile output.

It is therefore a general object of the present invention to provide an improved liquid level system of the character described above.

A specific object of the present invention is to provide a liquid level system of this character which requires no moving parts.

Another specific object of the present invention is to provide a liquid level system of this character which depends upon its operation on differences in cooling rates.

Another specific object of the present invention is to provide a system of this character in which only alternate ones of a series of vertically disposed thermocouples are artificially heated such that a voltage or current output is produced in accordance with the number of junctions immersed in the liquid.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates a system embodying features of the present invention.

FIG. 2 is a diagrammatic view of a typical electroplated thermopile used in the present system.

FIG. 3 is a perspective view illustrating the manner in which the thermocouples or thermopiles of FIG. 1 are wound spirally on an insulating rod for use in the system shown in FIG. 1, with electrical connections shown diagrammatically.

FIG. 4 is generally a cross-sectional view taken as indicated by the lines 4—4 in FIG. 3, with, however, the heater strip of FIG. 3 shown electrically insulated from both the thermopile and a surrounding metal sleeve.

FIG. 5 illustrates generally the relationship between liquid level and reading in output voltage, as produced by the composite thermocouples.

The thermocouple junctions of uniform cross-section with interconnecting conductors of uniform conductivity are formed by electroplating methods, as disclosed in our copending patent application Ser. No. 302,875, now abandoned, filed Aug. 19, 1963. A wire 10, such as constantan, has plated on alternate sections 12 thereof another metal of greater conductivity such as silver or copper. In this manner, a thermocouple junction 14 is formed at the beginning of each plated section 12, and another thermocouple junction 16 is formed at the end of each plated section 12. Thus, thermocouple junctions 14 and 16 are formed with uniform characteristics and alternate sections of constantan and constantan plated with silver or copper to provide uniform conductivity between adjacent thermocouple junctions and with all the elements being connected in an electrical series circuit.

The series of thermocouple junctions are wound spirally around a rod 5 of insulating material such that all thermocouple junctions 14 are grouped adjacently and all thermocouple junctions 16 are grouped adjacently, the junctions 14 being generally disposed by one-half of a turn or 180° from the other group of thermocouple junctions 16. This arrangement permits heating all junctions in one group with one simple heating element 18, such as a single section of Nichrome wire, strip or the like. Opposite ends of the heating element 18 are connected to correspondingly opposite terminals of a voltage source 6 which is preferably a regulated electrical power source, either alternating current or direct current, and preferably regulated both as to voltage and current to assure a constant power dissipation in element 18, regardless of aging or other effects which may result otherwise in changing the ohmic resistance of element 18. It may be sufficient to regulate source 6 only as to produce a constant applied voltage to element 18 such that there be some assurance that a constant amount of heat flux be produced for purposes described hereinafter. The series connected thermocouples comprising a thermopile are connected to a measuring indicating or control device 7 for developing an output signal, either voltage or current, representative of the net differential voltage between the hot and cold, i.e. unheated junctions.

It is noted that in FIG. 3, as illustrated, the rod 5 is provided with two internal bores 5A and 5B which serve generally as a conduit for the leads 6A and 7A, respectively, which are correspondingly connected near the lower end of rod 5 (FIG. 1) to one end of the heater element 18 and one end of the series of thermocouples. In some cases it may be desirable to replace the wires 6A and 7A by a common wire.

Device 7 may be any suitable measuring and indicating device known in the art, and may be a potentiometer or galvanometer type meter. As is well known, heating thermocouple junctions 14 develops a difference of electrical potential or voltage between hot junctions 14 and cold junctions 16, the voltage thus developed being multiplied by the number of thermocouple junction pair connected in series in the thermopile, making the thermopile considerably more sensitive than a single thermocouple. Consequently, device 7 may be calibrated to measure and indicate the voltage output of the thermopile.

As shown in FIG. 4, the strip of metal 18 (which extends longitudinally of rod 5) is electrically insulated from the junction 14 by a strip of material 20 having good electrical insulating properties and yet relatively good heat conductivity properties whereby the heat developed in the strip 18 is used to heat the junction 14.

Preferably, the assemblage of thermocouples is enclosed with a thin metal sleeve 22 with a strip of material 24, like strip 20, interposed between the heater strip 18 and the metal sleeve 22 to electrically insulate, but yet provide relatively good heat conductivity between the heater strip 18 and the other thin metal sleeve 22. If desired, the remaining annular space between the wound thermocouples and the metal sleeve 22 may be filled with a filler material 26 having both good electrical resistivity and heat conductivity.

The metal sleeve 22, when used, is of material which is noncorrosive with respect to the liquid whose level is to be determined.

Other techniques may be used in forming the series of spirally disposed thermocouple junctions, as described and claimed in our above mentioned patent application.

The rod 5 may have, for example, approximately 40 junctions per inch, measured along the axis of rod 5. The particular number of junctions used may be influenced by other factors such as voltage or current output and impedance matching.

Only a small amount of heating power is applied to the Nichrome strip 18, one watt or less, so that the heat developed in strip 18 has substantially no temperature effect on the liquid or on the gas blanket above the liquid.

The temperature sensed by any one of the particular thermocouple junctions 14 is dependent upon environmental condition, namely: as to those thermocouple junctions 14 which are below the level of liquid L in tank T, they as well as those unheated junctions 16 below the liquid level are all substantially at the same temperature, namely the temperature of the liquid, so that the net voltage output of these thermocouple junctions 14 and 16 considered alone (below the liquid level) is substantially zero, with the heat developed in the heater strip 18 below the liquid level being conveyed to the surrounding liquid without substantially changing its temperature. On the other hand, as to those thermocouple junctions 14 above the liquid level, the gas G which may be air or the liquid L in its gaseous state or a mixture of the two above the liquid is not a good conductor of heat and hence the temperature of this group of junctions 14 is elevated (with respect to the temperature of the fluid or gas), and there is thus a difference in voltage developed between junctions 14 and 16 above the liquid level M; and it is this difference in voltage which is indicated by the device 7.

It will be seen from the foregoing that the voltage or current indicated by the device 7 increases with a lowering of liquid level, and this is indicated by the somewhat curved line 30 in FIG. 5 which illustrates a nearly linear relationship between liquid level and voltage indicated by device 7, the abscissae in FIG. 1 being the voltage indicated at device 7 and the ordinates being the liquid level as measured from the bottom of tank 7. In accordance with the above, it will be seen that the voltage is higher the lower the liquid level, thus providing greater outputs at low liquid levels in a region where conventional liquid levels are usually less sensitive.

Theoretical considerations indicate that the voltage developed in the system should vary as the 1.25 power of the gas layer thickness. Such considerations involve convective heat transfer conductance from a vertical heated cylinder which varies inversely with the height (approximately the minus one-fourth power). It is thus expected that the resulting temperature difference and voltage signal vary as a slightly higher power than the first power, namely the 1.25 power. This is indicated also by the calibration curve 30 in FIG. 5 which is not quite linear.

It will be appreciated that in accordance with other aspects of the present invention, a level gauge as described may be used singly or in multiples in the same tank, with the voltage outputs being established for each such gauge. For example, when it is desired to measure the liquid level in a tank having an interface that is in chaotic motion or whose liquid distribution is not known, the output readings of a multiplicity of level gauges at different locations in the same tank may be used in establishing a mean or average liquid volume.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. Liquid level indicating apparatus for indicating liquid levels, comprising: a supporting member; an elongated wire wound helically about said member and insulated electrically therefrom; a metal plating on alternate sections of said wire, said plating having a greater specific conductivity than said wire; the ends of said sections comprising a first group of adjacently disposed thermocouple junctions, and a second group of adjacently disposed thermocouple junctions circumferentially spaced from the first group; means for heating the junctions in one of said groups; and means connected to the ends of said wire to measure the voltage developed by the temperature difference between said first and second groups.

2. Apparatus according to claim 1 in which alternate thermocouple junctions of said first and second groups are disposed diametrically opposite each other and each group of junctions is disposed in a substantially straight line adjacent the outer surface of said member.

3. Thermoelectric apparatus for indicating liquid level, comprising: an elongated wire having an given specific conductivity wound in a spiral; a metal plating on alternate sections of said wire, said plating having a greater specific conductivity than said wire; the ends of said sections comprising a first group of adjacently disposed thermocouple junctions, and a second group of adjacently disposed thermocouple junctions; means for heating only one of said groups of junctions; and means connected to the ends of said wire for measuring the voltage developed by the temperature difference between said first and second groups of junctions.

4. Thermoelectric apparatus for indicating liquid level, comprising: a rod composed of electrically insulative and thermally conductive material, said rod having at least one longitudinally disposed channel therein; an elongated wire having a given specific conductivity wound in a coil on said rod; a metal plating on alternate sections of said wire, said plating having a greater specific conductivity than said wire; the ends of said sections comprising a first group of adjacently disposed thermocouple junctions at one end of said rod, and a second group of adjacently disposed thermocouple junctions; means for heating one of said groups of junctions; and means including a conductor extending through said channel and connected to the ends of said wire for measuring the voltage developed by the temperature difference between said groups of junctions.

5. Liquid level sensing apparatus, comprising: a supporting member; an electrical circuit including a first group of adjacent disposed thermal sensitive elements and a second group of thermal sensitive elements on said supporting member spaced from the first group, all of said elements being connected in series; means for heating only one of said groups of elements whereby only said one group is subjected to heat from said heating means, and electrical measuring means connected in series with said elements to measure an electrical characteristic developed by the temperature differential when the heated and non-heated elements are exposed to a liquid and a gas space above the liquid, said elements being thermocouples, alternate thermocouple junctions of said first and second groups being disposed diametrically opposite each other and adjacent thermocouple junctions within each group being disposed substantially along a straight line adjacent the outer surface of said member.

References Cited

UNITED STATES PATENTS

| 2,702,476 | 2/1955  | Boisblanc | 73—295 |
| 3,279,252 | 10/1966 | Barlow    | 73—295 |
| 3,280,627 | 10/1966 | Cousins   | 73—295 |

FOREIGN PATENTS 44,368  10/1934  France.

LOUIS R. PRINCE, *Primary Examiner.*

S. C. SWISHER, *Assistant Examiner.*